Feb. 16, 1960   C. R. WHITING   2,924,991
SPEED-TORQUE CONVERTER
Filed April 14, 1955   2 Sheets-Sheet 1

INVENTOR.
Cuthbert R. Whiting.
BY
ATTORNEY

Feb. 16, 1960  C. R. WHITING  2,924,991
SPEED-TORQUE CONVERTER
Filed April 14, 1955  2 Sheets-Sheet 2

INVENTOR.
Cuthbert R. Whiting.
BY
ATTORNEY

United States Patent Office 2,924,991
Patented Feb. 16, 1960

2,924,991
SPEED-TORQUE CONVERTER

Cuthbert R. Whiting, Saddle River, N.J., assignor of ten percent to E. Lowell Taylor, Kew Gardens, N.Y.

Application April 14, 1955, Serial No. 501,285

9 Claims. (Cl. 74—675)

This invention relates to a speed and torque converter and more particularly to a mechanism that uses a differential arrangement, or a power source whose output is split between two contra-rotating elements, and a double worm or spiral gear arrangement to control the ratio of speed and torque of the power transmitted by the device, by controlling one of the differential shafts, or one of the split torque shafts.

The double worm and worm gear, or double spiral driver and spiral follower gear arrangement which constitutes the controlling element of the torque converter may be controlled by a small portion of the input power source of the torque converter, which may be fed to the controlling gear or gears from any part of the power train by mechanical means. Or it may be conveniently and effectively controlled by an electric motor or motors of relatively low power and torque, as compared to the main power source, which may be "constant speed" for some applications, or controlled "variable speed" motors for others.

For the purposes of this disclosure the term "supervisory gears" and "control motor" will be used hereinafter for the controlling worm or spiral gears and for the control power source for the device, respectively.

A primary object of this invention is to provide a full range speed and torque converter mechanism which will give a continuously variable input to output ratio of speed versus torque, throughout the range of zero output speed (neutral) to straight through drive, for any speed of an input power source, without the need for auxiliary gear shift ratios in the power train in order to achieve full range conversion.

In one embodiment here disclosed the invention provides means to drive a tractive vehicle, such as an automobile, truck or locomotive, while using an internal combustion engine as the prime mover and a small electric motor of conventional speed and low power as the control motor. The control motor consumes power only while torque conversion is required, such as in starting, accelerating, or climbing grades. When the device is in straight through drive (the equivalent of "high"), no power is required by the control motor, nor does it rotate, and the supervisory gears are at rest. No slippage can occur in straight through drive, as the power train is through constantly meshed gears.

Another object of this invention is to provide a full range speed and torque converter mechanism that requires reasonably low speeds for the control motor, so that such motors will be commercially available at quantity production prices. In one embodiment here disclosed, the control motor speed need only equal the prime mover speed. In another embodiment here disclosed it may be one half the prime mover speed or any proportion of prime mover speed required, by proper selection of the supervisory gear ratios of the four gear type shown in one figure of the drawing and hereinafter more fully described. With this arrangement full advantage may be taken of the modern high speed gasoline or diesel engine, while retaining full range speed and torque conversion control and using standard speed electric motors for control motors.

Generally stated, one embodiment of the invention consists of a differential of any type with the main power source driving one shaft; or the use of the differential effect obtained between the two contra-rotating elements of any power source arranged so that the output torque is split between two shafts; with one output shaft of either the differential or the split torque power source controlled by a supervisory gear arrangement consisting of a worm or spiral driver gear connected to the controlled shaft, meshed with a worm gear, or spiral follower gear, on which is meshed a second worm or spiral driver gear which is connected to a source of control power, shown as an electric "control motor." The worms and worm gear, or the spiral gear sets used for control are of the type which can transmit power in one direction, only i.e. from worms to worm gear, as in small lead angle worms and mating worm gear; or from spiral gear drivers to spiral gear follower, as is the case with drivers with a small lead angle and a follower with a large lead angle. The remaining output shaft is connected to the load, complete control of its speed and torque being obtained by controlling the other output shaft through the supervisory gear arrangement, combined with a source of control power.

A split torque power source may be defined, for the purposes of this disclosure, as any prime mover whose output torque appears at one power shaft, while the equal and opposite reactance torque appears at another power shaft. A differential is not required as a part of the torque-converter, when a split torque power source is used.

Other objects and advantages of this invention will appear more fully from the following detailed description taken in connection with the accompanying drawings, wherein.

Referring now to the drawings in detail wherein like reference numerals indicate similar parts throughout the several views and figures.

Figure 1:
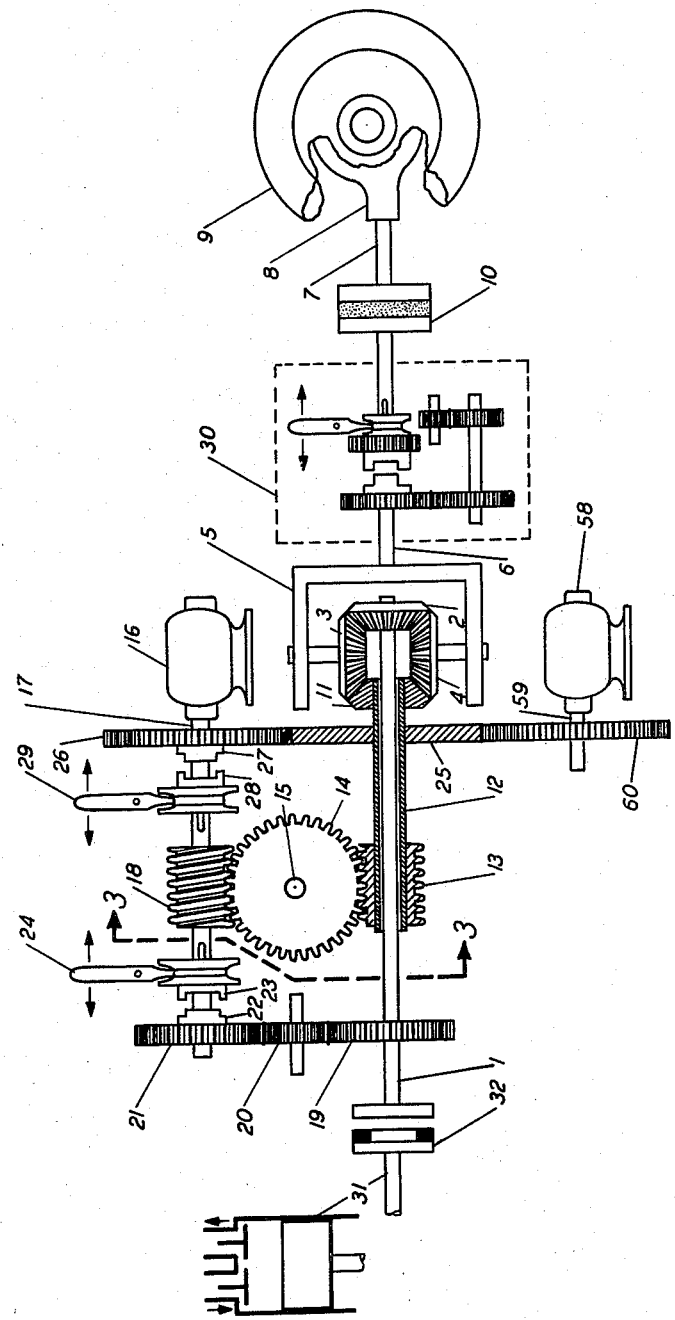
Figure 1 is a view in side elevation and partial section showing one embodiment of the speed and torque converter, using an internal combustion engine in a vehicular application of the device.

In Figure 1, one form of the device may include a prime mover shown as a gasoline engine 31, driving a shaft 1, through clutch 32, connected to bevel gear 2, of a conventional bevel gear differential. This gear 2, meshes with planetary gears 3 and 4, which are connected to the planet gear carrier 5 and to shaft 6 which is normally directly coupled through gear box 30 to universal joint 10 and shaft 7 to automotive rear axle assembly 8 and thence to the drive wheels 9. This is the normal power train of the device in "straight through" drive and when differential bevel gear 11 is held stationary, provides an overall input to output ratio of 1 to 2 between engine 31 and shaft 7, which may be adjusted to the appropriate overall ratio for motor vehicle use by providing the proper final drive ratio in the master and pinion gear set in the rear axle assembly of the vehicle.

The bevel gear 11, of the differential used in the speed-torque converter device is connected by hollow shaft 12 to worm 13, which meshes with idler worm gear 14 rotating about shaft 15 in stationary bearings. Electric control motor 16 is arranged to drive shaft 17 connected to worm 18 and dogs or clutches 23 and 28, which are shown in the open or non-driving position, in relation to meshing jaw coupling or toothed clutch 22 and 27. Worm 18 meshes with idler worm gear 14.

When torque is provided by engine 31 to output shaft 7 and thence to the drive wheels of the vehicle, part of this torque will be applied to worm 13, through planetary gears 3 and 4, bevel gear 11 and hollow shaft 12. This will attempt to rotate the idler worm gear 14 and its shaft 15, but the motion will be prevented by the locking action of worm 18, also meshing with worm gear 14, if worm pinion 18 is at rest. No matter how great the force applied to the teeth of worm 18, by worm gear 14, no movement of the worm can take place since the lead angle is less than the friction angle. The non-reversible worm gearing shown in Figure 1 consists of two single thread worms 13 and 18 and one 35 tooth worm gear 14, all of the same hand and intermeshing.

When engine torque is applied to the teeth of worm gear 14 and rotation is stopped by the teeth of the meshing non-reversible worm 18, the application of control motor torque to worm 18, in a direction aiding that in which worm 13 is attempting to rotate will unlock worm 18 and drive worm gear 14 in the direction in which it is being urged to rotate by engine torque on worm 13. Thus the worm gear 14 will rotate, both the engine torque on worm 13 and the control motor torque on worm 18 driving idler worm gear 14.

If sufficient current is supplied to control motor 16 to drive it at the same speed as the engine output shaft 1, and in the same direction, then worm 13 on hollow shaft 12 and differential bevel gear 11 will rotate in the opposite direction and dissipate all the speed of the engine 31, in merely idling the idler worm gear 14 on its shaft 15, providing no power through the differential to shaft 7, connected to the driving wheels of the vehicle. The device may then be said to be in neutral.

This neutral will be effective so long as the static friction of the vehicle is sufficient to supply all the torque of engine 31 to bevel gear 11, shaft 12 and worm 13 in order to drive worm gear 14 as an idler gear, while worm 18 is also urging it to rotate. This would be the case in general, when the vehicle is on the level and the static friction of the drive wheels exceeded the friction through the gear train just described. However, under certain conditions, such as a slight down grade, "creeping" might tend to occur at the drive wheels. To prevent this "creeping" under light load or slight down grade conditions, motor 58 with driving shaft 59 attached to spur gear 60 which meshes with spur gear 25 on shaft 12, is provided. With motor 58 energized and rotating in the same direction as control motor 16, the mass, inertia and friction of gears 2, 3, 4. 11 and shaft 12, worm 13, worm gear 14 and shaft 15 will be overcome, so that if control motor 16 exceeds or equals the speed of engine 31, a "neutral" without "creeping" will exist, under most conditions. Motor 58, which overcomes gear and bearing friction to reduce "creeping," as just described, may be called the "follower motor."

In order to provide a "positive" neutral through positively meshed gears, the operation of lever 29 while both control motor 16 and follower motor 58 are energized, will engage jaw coupling or toothed clutch 28—27 so that spur gear 25 attached to shaft 12 will drive control motor shaft 17 and worm 18 at the same speed and in the opposite direction from shaft 12. With the backlash between worm gear 14 and worm 18 previously taken up in the driving direction for worm 18, by the energized control motor 16 and follower motor 58, the jaw coupling or toothed clutch 28, 27 will be meshed with gears 26 and 25 in such manner that worm 18 will be driven without thrust on the non-reversible side of its teeth, hence will not exert a retarding effect on worm gear 14, thus allowing a "free" rotation of the supervisory gear assembly. This "positive" locked in neutral may be used for coasting, after the vehicle is in motion, without providing power to control motor 16 or follower motor 58, once the gears are meshed, as described. Or it may be used for a "neutral" while the vehicle is at rest, in which case the energizing of follower motor 58 with the proper amount of electric power will reduce or prevent "creeping" at the drive wheels but will not prevent coasting.

In order to provide a "positive" locked in neutral for engine starting and "warm-up" and for positive braking of the drive wheels of the vehicle during this starting and warm-up period, gear 19 connected to engine output shaft 1, drives gears 20 and 21 which may be connected to the controlling worm 18 through the meshing of the jaw coupling or toothed clutch 22 and 23 by operation of lever 24. When this lever 24 is operated in addition to lever 29 the device is positively locked in "neutral" regardless of power applied to the control motor or power applied by engine 31. Engine 31 may then be run over the entire range of speeds from a position of rest, idling speed, to full "no load" speed if desired without any output torque appearing at shaft 7 and with positive braking of shaft 7 for the full range of speeds of the engine.

In preparation for starting the vehicle, sufficient current should first be provided to control motor 16 to slightly exceed idling speed of engine 31, then levers 24 and 29 should be released, opening the jaw coupling or toothed clutch members 22 and 23 driving worm 18 from engine power and opening the jaw coupling or toothed clutch members 27 and 28 which provided the "positive" neutral. Control motor 16 will continue to drive worm 18 at engine idling speed, keeping the power output at shaft 7 at zero, and retaining the neutral effect at shaft 7 with the "creeping" effect minimized by energizing follower motor 58, if required. Worm 18 cannot exceed the idling speed of engine 31 even if more power is provided by control motor 16, as any excess power will be blocked at non-reversable worm 13 on worm gear 14. Increasing the speed of engine 31 above idling speed will result in an increase in speed of worm 13 and an increase in speed of worm gear 14 and worm 18 until the controlled speed of control motor 16 is reached. Then excess speed over the control motor speed will be blocked at non-reversible worm 18, resulting in any excess beyond control motor speed being furnished at the output shaft 7 through the differential of the torque converter, to drive the wheels of the vehicle 9.

As engine 31 speed is increased and output shaft 1 speed continues to exceed control motor speed, more speed is furnished through the differential to output shaft 7, under complete control of the control motor which may be varied in speed as required for different effective ratios, or left at a pre-set speed of just over engine idling speed until straight through drive of the device is desired, which may be accomplished by merely stopping the control motor, either manually or through an automatic speed or torque sensitive device. Straight through drive is the equivalent of high, and most drying is done in this ratio.

In the device shown in Figure 1 the ratio may be computed from the equation:

Ratio (input to output)

$$= \frac{\text{input speed minus control speed}}{2 \times \text{input speed}}$$

In order to provide a reverse with all of the above speed and torque conversion features, gear-box 30 is shown. It contains a conventional lock-through arrangement for 1 to 1 ratio drive in a forward direction, one set of reverse gears with a conventional ratio and a neutral position.

Clutch 32 is provided so that the vehicle may be moved freely or may coast freely, when it is disengaged. It may be required to start engine 31 by pushing the vehicle when the normal starting system fails, or it may be used for coasting if disengagement of the engine is desired.

Figure 2:
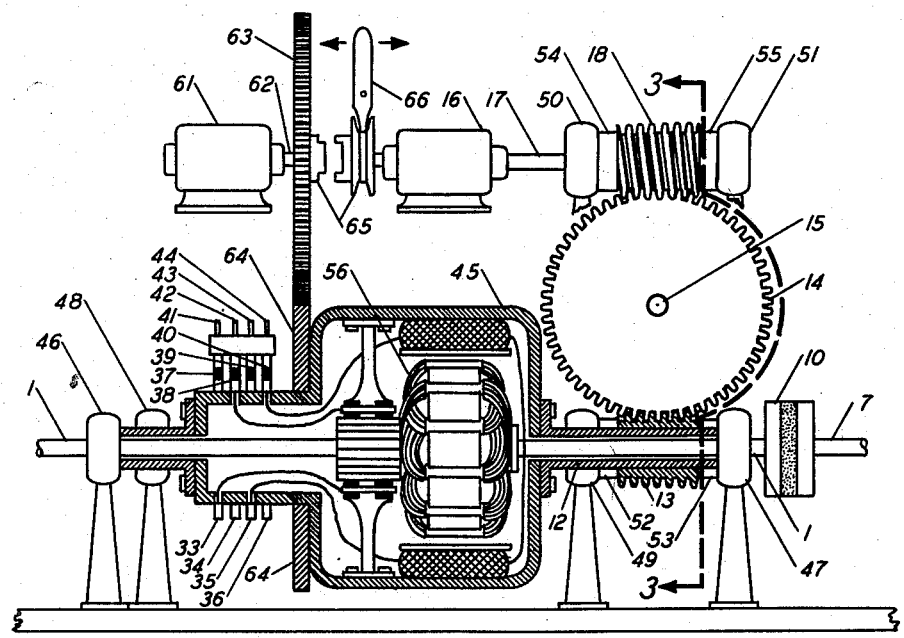
Figure 2 is a view in side elevation and partial section, showing another embodiment of the speed and torque converter, using an electric motor as the prime mover, arranged as a split-torque device. No differential is shown or required in this application.

In Figure 2 another embodiment of the device is shown in which the armature 56 of an electric motor, driving shaft 1 is connected by coupling or universal joint 10, to output shaft 7. This shaft 1 is supported in bearings 46 and 47. The motor housing and field assembly 45 is arranged to rotate freely on bearings 48 and 49 and is connected through hollow shaft 12 to worm 13, which meshes with idler worm gear 14 rotating about shaft 15 in stationary bearings. Slip rings 33, 34, 35 and 36 mounted on an extension of motor housing 45 and insulated therefrom, are internally connected to the field windings and brushes in such manner that electric power fed to the slip rings will energize the motor in the conventional manner, with sufficient slip rings provided for operation in either the forward direction, or reverse. Brushes 37, 38, 39 and 40 are mounted in stationary brush holders, insulated from each other and the framework and are connected respectively to insulated stationary terminals 41, 42, 43 and 44 from which electric power is fed to the motor. 52, 53, 54 and 55 are thrust bearings.

Variable speed electric control motor 16 is arranged to drive shaft 17 connected to worm 18, which meshes with idler worm gear 14 on shaft 15. No bearings are shown for shaft 15 and no support for motor 16, for clarity in the drawing.

When torque is provided by motor armature 56 to shaft 1 and thence to the output shaft 7, part of this torque will be applied to the field assembly and motor housing 45 but in the opposite direction of rotation from that of the armature. Housing 45 will transmit this reverse torque through hollow shaft 12 to worm 13, meshing with idler worm gear 14. This will attempt to rotate the idler gear 14 about its shaft 15, but the motion will be prevented by the locking action of worm 18, also meshing with worm gear 14, if worm 18 is at rest. No matter how great the force applied to the teeth of worm 18, by worm gear 14, no movement of the worm can take place, since the lead angle is less than the friction angle. The non-reversible worm gearing shown in the drawing consists of two single thread worms 13 and 18 and one 57 tooth worm gear 14, all of the same hand and intermeshing. Any reasonable number of teeth may be used on worm gear 14, the minimum number for maximum efficiency being 35 to 40 (approximately). In any case, where 3 intermeshing gears are used, as shown, the ratio from worm 13 to worm 18 will always be 1 to 1.

When field assembly and motor housing 45 torque is applied, as described, to the teeth of worm gear 14 and rotation of this gear is stopped by the teeth of the meshing non-reversible worm 18, the application of control motor 16 torque to worm 18, in a direction aiding that in which worm 13 is attempting to rotate will unlock worm 18. The control motor 16 will then drive worm gear 14 in the direction in which it is being urged to rotate by that portion of the drive motor torque developed between contra-rotating elements 56 and 45 of the main drive motor which is applied to worm 13. Thus the worm gear 14 will rotate, both the drive motor torque on worm 13 and the control motor torque on worm 18 driving idler worm gear 14.

If sufficient current is supplied to control motor 16 to drive it at the same speed as the speed of worm 13, while shaft 1 remains stationary while connected to the load on output shaft 7, then idler worm gear 14 on shaft 15 will rotate freely and dissipate all the speed of the drive motor, while the armature 56 remains stationary and the field and housing assembly 45 rotates freely. The device may then be said to be in neutral. When the "neutral" condition exists, worm 18 cannot exceed the speed of the rotating field and housing assembly 45, as any excess speed will be blocked at non-reversible worm 13 on worm gear 14. Thus for a neutral condition the speed of control motor 16 is not critical, so long as sufficient current is applied to the control motor to equal or exceed the speed of the rotating field and housing assembly 45. The blocking of excess control motor power at the non-reversible worm 13 also assures that the control motor cannot furnish power to the output shaft at any time, even under light load or no load conditions.

Under light load or no load conditions at output shaft 7, the friction at bearings 48, 49 and the supervisory gears, added to windage losses at the rotating field and housing assembly 45 may exceed the friction at bearings 46, 47 and the load, added to windage losses at armature 56. Under these conditions, creepage could exist at shaft 7, when a neutral or zero speed condition at shaft 7 is desired. Follower motor 61 with its shaft 62 attached to spur gear 63 which meshes with spur gear 64, attached to rotating field and housing assembly 45 is provided to assure a positive neutral. When follower motor 61 is energized and rotates in the same direction as control motor 16, with control motor 16 also energized, the rotating field and housing assembly 45 is forced to rotate in the proper direction and speed to assure a "neutral" or zero output at shaft 7. The operation of lever 66 to close clutch 65 will by-pass the supervisory gears 13, 14 and 18 through spur gears 63 and 64, to assure a positive neutral, provided the engagement is made while supervisory gear back-lash is taken up by the thrust of motors 16 and 61. With this mechanically locked in neutral it may still be necessary under "no load" conditions to drive the housing by operating motor 61, in order to assure zero output at shaft 7, or "positive" neutral, if such is desired.

In starting a load on shaft 7, lever 66 should be operated to the left, so that clutch 65 is open. If current is supplied to the main drive motor and the control motor, then the rotating field and housing assembly 45 increases in speed and the speed of worm 13 will increase, increasing the speed of worm gear 14 and allowing worm 18, under the urging of the control motor, to increase in speed, until the controlled speed of control motor 16 is reached. Then any excess speed over the control motor speed will be blocked at non-reversible worm 18, resulting in a restraining effect on the rotating field and housing assembly 45, beyond control motor speed. The reaction to this results in torque being applied to the armature shaft 1 in the normal direction of rotation of the main drive motor, and power will be supplied to the output shaft 7.

As the main drive motor speed is increased, excess speed over the speed of the control motor is furnished at output shaft 7 under complete control of the control motor, which may be varied in speed for different effective ratios, or left at a pre-set speed while the main drive motor is accelerated to full speed, if required, and then straight through drive of the device may be obtained by merely stopping the control motor. Straight through drive as a 1 to 1 ratio in the normal direction of rotation, with the control motor and all gears stopped and the field and housing assembly at rest, just as they would be for a conventional stationary field motor.

In the device just described for electric motor control and shown in Fig. 2 of the drawing, the ratio may be computed from the equation:

Ratio (input to output)
$$= \frac{\text{input speed minus control speed}}{\text{input speed}}$$

where "input speed" is the relative speed between the armature and the field and housing assembly. This is the design speed of the motor for the load being applied, at full power input.

In order to provide for operation in the opposite direction of rotation with all of the above speed and torque conversion features, the control motor 16 must be reversed at the same time that the main drive motor is reversed. If follower motor 61 is used, it must also be reversed.

Figures 3, 4:
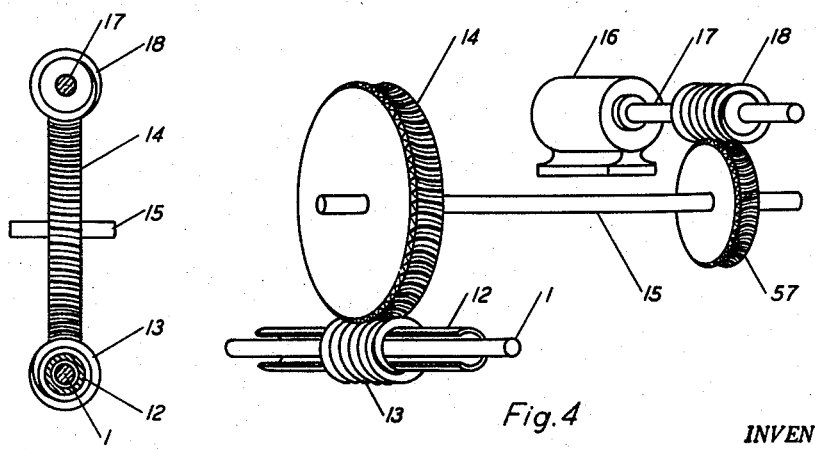
Figure 3 is a view of the supervisory gears in vertical section taken on the line 3—3 of Figures 1 and 2.
Figure 4 shows a perspective view of a 4 gear arrangement of the supervisory gears, which may be used in place of the 3 gear intermeshing type shown in Figures 1, 2 and 3, in order to provide a different ratio for the control motor.

In Figure 3, the simplest and most economical arrangement of the supervisory gears is shown. This view represents section 3—3 of Figures 1 and 2, in which reference numeral 1 is the driving shaft of the normal power train. Hollow shaft 12 is the controlled shaft and 13 is a right hand single thread worm, attached to hollow shaft 12. 14 is a right hand worm gear, free to rotate about shaft 15 in stationary bearings, not shown. 18 is a right hand single thread worm, attached to shaft 17, which is driven by control motor 16, shown in Figures 1 and 2. Worms 13 and 18 each mesh with worm gear 14, but are shown 180 degrees apart. If worms 13 and 18, each in stationary bearings are driven in opposite directions, then intermeshing worm gear 14 will rotate freely on shaft 15, also in stationary bearings.

In Figure 4, another arrangement of the supervisory gears is shown, which may be used as the controlling element in place of the intermeshing worms and worm gear shown in Figures 1, 2 and 3. Shaft 1 represents the driving shaft. Hollow shaft 12, attached to worm 13 is connected to bevel gear 11 of Figure 1, or rotating field and housing assembly 45, of Figure 2. Worm 13 meshes with worm gear 14 on shaft 15. Control motor 16, drives shaft 17, which is attached to worm 18, which, in this case is meshed with worm gear 57, on shaft 15. Worm gears 14 and 57 are each connected to shaft 15, so that they are, in effect, connected together and both rotate with shaft 15, journalled in stationary bearings. All bearings and the control motor mounting are omitted from the drawing for clarity.

This arrangement, using four gears instead of the three shown in Figures 1, 2 and 3, gives exactly the same controlling effect as the intermeshing sets of worms and worm gear provided for Figures 1 and 2, except that there are certain design advantages that may be realized by the use of Figure 4.

One advantage provided by Figure 4 is that a choice of ratios between the control motor shaft 17, and the controlled shaft 12 may be provided in the original design of the device. In Figure 4, the ratio between worm set 13 and 14 is 1 to 60, the ratio of worm gear set 57 and 18 is 30 to 1, providing an overall ratio between shaft 12 and shaft 17, of 2 to 1. With this arrangement, shaft 12, may be driven up to 4000 r.p.m., as with a high speed gasoline engine, and shaft 17, driven by control motor 16, need only operate at a maximum of 2000 r.p.m. for full range control. Other ratios may be provided, in accordance with design requirements, by selection of appropriate worm ratios.

A further design advantage is provided in that the control motor 16 and its shaft 17 may be arranged for either direction of rotation. In Figure 4, gears 13 and 14 are right hand, and gears 18 and 57 are left hand, providing for rotation of shaft 17 in the same direction as shaft 12, a condition not possible with intermeshing worms and worm gear, which must all be of the same hand and in which case shafts 17 and 12 will be contra-rotating. In Figure 4, contra-rotation of shafts 17 and 12 may be provided, if desired, by either moving worm 18 to the bottom of worm gear 57 or worm 13 to the top of worm gear 14. Or contra-rotation may be provided by using all four gears of the same hand, with relative locations of worms unchanged from that shown in Figure 4.

With this arrangement of supervisory gears, design flexibility may be provided in the location of the control motor shaft 17, relative to controlled shaft 12. A longer shaft 15 may be provided to allow the control motor to clear the main power source, or this shaft may be adjusted in length for the best design.

With this arrangement it may not be necessary to provide thrust bearings on shaft 15, or if provided, wear may be reduced, for if worm and worm gear sets of opposite hand are used, the thrust on shaft 15 will be largely neutralized.

Wear of the gears will be distributed between two sets, instead of localized in one worm gear and the problem of mating and wear-in may be reduced by using two separate matched worm and worm gear sets.

Finally, there may be some advantage obtained in heavy duty applications, where heat developed by the two worms will be distributed between two worm gears, when the arrangement shown in Figure 4 is used.

It will be obvious that the embodiments herein disclosed are only illustrative and not exhaustive of the invention and may be varied in many ways without departing from the spirit of the invention as principally characterized by the provision of means to control a torque converter through the use of non-reversible worm or spiral gears in a "back-to-back" arrangement which provides a low ratio between the controlled shaft and the controlling shaft while preventing control power from feeding into the power train and as further characterized by additionl features and combinations thereof particularized and pointed out in the appended claims.

What is claimed is:

1. A speed-torque conversion mechanism comprising a drive shaft, prime mover means for driving said drive shaft, a driven shaft, a differential mechanism between said shafts, a worm connected with said differential mechanism and tending to be driven thereby for controlling the speed torque ratio thereof, a worm gear engaging said worm, a second worm for controlling said gear, and separate prime mover means for controlling the movement of said control means.

2. A speed-torque conversion mechanism comprising a drive shaft, a driven shaft, a bevel gear on said drive shaft, a tubular shaft on said drive shaft having a bevel gear thereon, a planetary gear engaging said bevel gears, a planet gear carrier for said planetary gear connected to said driven shaft, a worm on said tubular shaft, a worm gear engaging said worm, a second worm for controlling the movement of said worm gear, and means operable to actuate said control worm.

3. A speed-torque conversion mechanism comprising a drive shaft, prime mover means for driving said drive shaft, a driven shaft, a differential having an input element connected to said drive shaft, an output element connected to said driven shaft, and a control element, a control shaft connected to said control element, a worm on said control shaft, a worm gear engaging said worm, a second worm for controlling the movement of said worm gear, and separate prime mover means operable to actuate said second worm.

4. A speed-torque conversion mechanism comprising a drive shaft, prime mover means for driving said drive shaft, a driven shaft, a differential having an input element connected to said drive shaft, an output element connected to said driven shaft, and a control element, a control shaft connected to said control element, a worm on said control shaft, a worm gear engaging said worm, a second worm for controlling the movement of said worm gear, and separate prime mover means for driving each of said worms in a direction and at a speed at which the output shaft is stationary.

5. A speed-torque conversion mechanism comprising a drive shaft, a prime mover means for driving said drive shaft, a driven shaft, a differential having an input element connected to said drive shaft, an output element connected to said driven shaft, and a control element, a control shaft connected to said control element, a worm on said control shaft, a worm gear engaging said worm, a second worm driven by a separate prime mover for controlling the movement of said worm gear, gear means for positively interconnecting said worms to allow said driven shaft to remain stationary and an optionally engageable jaw coupling or toothed clutch for controlling said interconnection.

6. A speed-torque conversion mechanism comprising a drive shaft, prime mover means for driving said drive shaft, a driven shaft, a differential having an input element connected to said drive shaft, an output element connected to said driven shaft, and a control element, a control shaft connected to said control element, a worm on said control shaft, a worm gear engaging said worm, a second worm driven by a separate prime mover for controlling the movement of said worm gear, and optionally engageable jaw coupling or toothed clutch means for interconnecting said worms and connecting the last mentioned worm to the drive shaft to cause said driven shaft to remain stationary.

7. A gear mechanism comprising a worm, a prime mover tending to drive said worm, a worm gear having a fixed axis of rotation, a second worm for permissively allowing said worm gear to rotate and a second prime mover operable to actuate said second worm.

8. A speed-torque conversion mechanism comprising a drive shaft, a prime mover means for driving said drive shaft, a driven shaft, a differential unit interconnecting said shafts, a worm connected to said differential unit for controlling the speed-torque ratio between said shafts, a worm gear engaged by said worm, a second worm engaging said worm gear and a separate prime mover variable speed driving means for controlling the movement of said second worm.

9. A speed-torque conversion mechanism comprising a drive shaft, prime-mover means for driving said drive shaft, a driven shaft, a differential mechanism connecting said shafts, a worm connected with said differential mechanism and tending to be driven thereby for controlling the speed-torque ratio thereof, a worm gear engaging said worm, a second worm driven by a separate prime mover for controlling said gear, and gear means for controllably and without slip interconnecting said worms and connecting the last mentioned worm to the drive shaft to cause said driven shaft to remain stationary.

References Cited in the file of this patent

UNITED STATES PATENTS

| | | |
|---|---|---|
| 378,547 | Hill | Feb. 28, 1888 |
| 1,274,918 | Magg | Aug. 6, 1918 |
| 1,418,325 | Patterson | June 6, 1922 |
| 1,472,848 | Magg | Nov. 6, 1923 |
| 1,490,671 | Lindstrom et al. | Apr. 15, 1924 |
| 2,005,891 | Elherty | June 25, 1935 |
| 2,847,876 | Willard | Aug. 19, 1958 |

FOREIGN PATENTS

| | | |
|---|---|---|
| 191,915 | Switzerland | Sept. 16, 1937 |